(12) United States Patent
Rivera Kurezyn et al.

(10) Patent No.: US 10,766,546 B2
(45) Date of Patent: Sep. 8, 2020

(54) USER FRIENDLY APPARATUS AND METHOD FOR RETAINING AND REMOVING A SPARE TIRE FROM A STORAGE POSITION IN A MOTOR VEHICLE

(71) Applicant: FORD GLOBAL TECHNOLOGIES, LLC, Dearborn, MI (US)

(72) Inventors: Juan Esteban Rivera Kurezyn, Cuautlancingo (MX); Jose Carlos Parada Centeno, Cuatitlan Izcalli (MX); Elias Aram Loza Neri, Lerma (MX); Juan Carlos Martinez Navarrete, Tultepec (MX); Raul Ahuitzol Quintanar Quintanar, San Juan del Rio (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/057,200

(22) Filed: Aug. 7, 2018

(65) Prior Publication Data
US 2020/0047828 A1 Feb. 13, 2020

(51) Int. Cl.
*B62D 43/00* (2006.01)
*B62D 43/10* (2006.01)

(52) U.S. Cl.
CPC ............ *B62D 43/002* (2013.01); *B62D 43/10* (2013.01)

(58) Field of Classification Search
CPC .............................. B62D 43/002; B62D 43/10
USPC ...................................................... 224/42.24
See application file for complete search history.

(56) References Cited

U.S. PATENT DOCUMENTS

| 5,638,710 | A | 6/1997 | Howard, Jr. et al. | |
| 6,213,361 | B1 * | 4/2001 | Dexel | B62D 43/007 224/42.24 |
| 6,406,000 | B1 * | 6/2002 | Raz | B62D 43/045 224/42.23 |
| 6,527,252 | B2 * | 3/2003 | Dziedzic | B62D 43/045 224/42.12 |
| 8,839,995 | B2 * | 9/2014 | Corral Rodriguez | B62D 43/045 224/42.23 |

FOREIGN PATENT DOCUMENTS

| CN | 108016517 A | 6/1997 |
| CN | 203681676 U | 7/2014 |

(Continued)

OTHER PUBLICATIONS

English Machine Translation of CN105015634A.
(Continued)

*Primary Examiner* — Peter N Helvey
(74) *Attorney, Agent, or Firm* — David Coppiellie; King & Schickli, PLLC

(57) ABSTRACT

An apparatus is provided for retaining a spare tire in a storage position on a motor vehicle. The apparatus includes a retainer assembly and a cooperating post. The retainer assembly includes a housing and a first actuator, a first retainer and a first biasing element carried by the housing. The post includes a retainer receiver wherein the first biasing element biases the first retainer into engagement with the retainer receiver. A related method of removing a spare tire from a storage position in a motor vehicle is also presented.

17 Claims, 5 Drawing Sheets

(56) References Cited

FOREIGN PATENT DOCUMENTS

| | | |
|---|---|---|
| CN | 105015634 A | 11/2015 |
| CN | 205345094 U | 6/2016 |
| CN | 106741238 A | 5/2017 |
| CN | 206579724 U | 10/2017 |

OTHER PUBLICATIONS

English Machine Translation of CN106741238A.
English Machine Translation of CN108016517A.
English Machine Translation of CN203681676U.
English Machine Translation of CN205345094U.
English Machine Translation of CN206579724U.

* cited by examiner

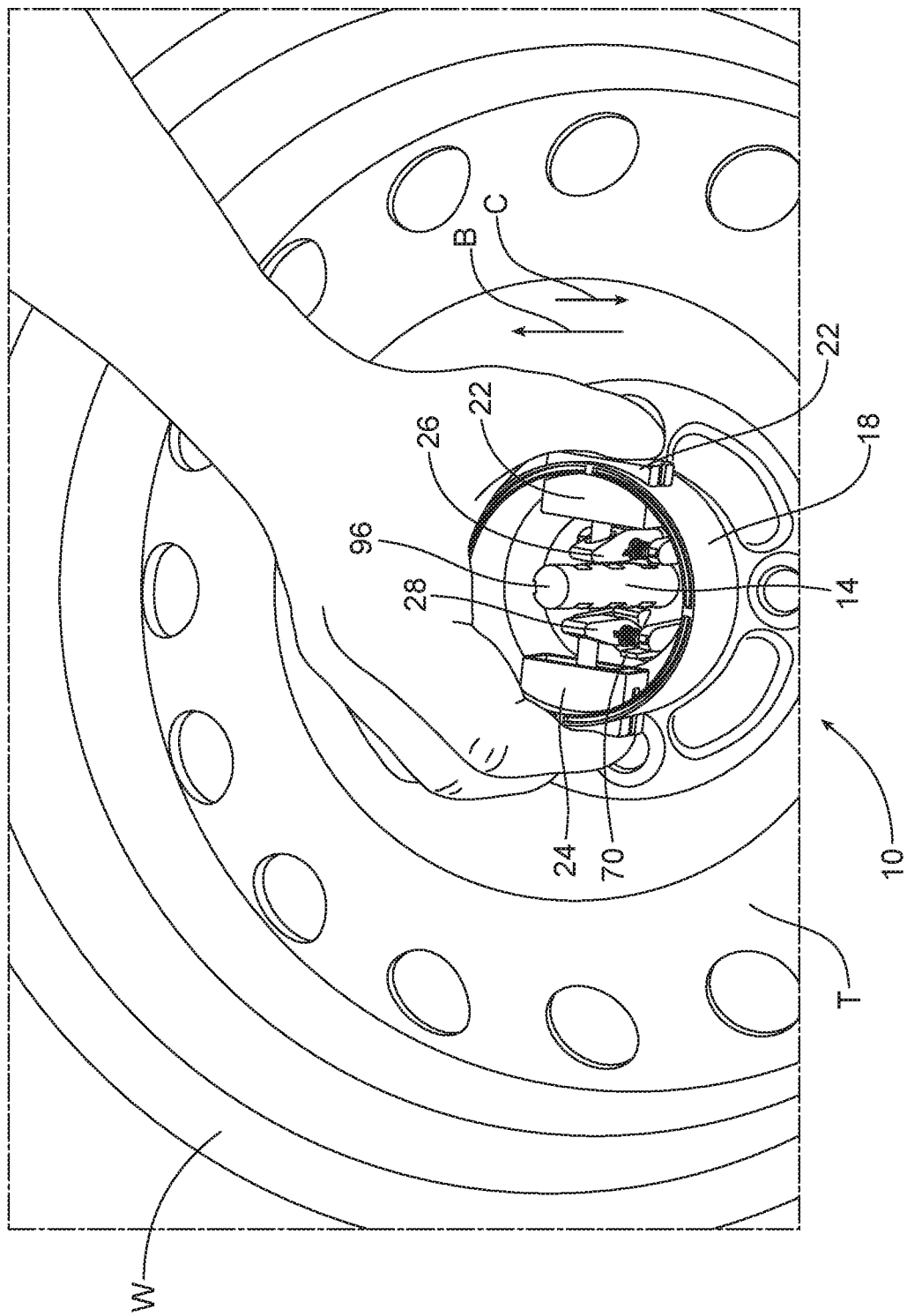

USER FRIENDLY APPARATUS AND METHOD FOR RETAINING AND REMOVING A SPARE TIRE FROM A STORAGE POSITION IN A MOTOR VEHICLE

TECHNICAL FIELD

This document relates generally to the motor vehicle equipment field and, more particularly, to a new and improved apparatus and method for retaining and removing a spare tire from a storage position in a motor vehicle.

BACKGROUND

It is common practice to equip a motor vehicle with a spare tire that may be utilized in the event a flat tire is developed during operation of the motor vehicle. In order to conserve useful occupant and storage space within the motor vehicle, the spare tire is often located in an out-of-the-way and difficult to reach location. For example, it is common practice to position a spare tire in a spare tire well located underneath the load floor of the storage compartment or trunk of a motor vehicle.

In order to hold this spare tire in position and prevent movement thereof and rattling during operation of the motor vehicle, a retainer is provided to positively maintain the spare tire in position within the storage well. In the past, it has been common practice to utilize a retainer that screws onto a bolt or threaded post to secure the spare tire in position. Such a retainer is provided at a difficult to reach location and typically requires turning many times in order to release the retainer from the threaded post to allow removal of the spare tire.

This document relates to a new and improved apparatus and method that utilize a retainer assembly that may be more easily and conveniently removed by simply depressing two opposed actuators. Such a user friendly retainer assembly represents a significant advance in the art that provides a more customer satisfying experience when the motor vehicle user must access and remove the spare tire.

SUMMARY

In accordance with the purposes and benefits as described herein, a new and improved apparatus is provided. That apparatus comprises a retainer assembly including (a) a housing and (b) a first actuator, a first retainer and a first biasing element carried by the housing. In addition, the apparatus comprises a post having a retainer receiver wherein the first biasing element biases the first retainer into engagement with the retainer receiver.

The housing may include a post receiver. The post may extend through the post receiver when the retainer assembly is secured to the post. The first actuator may include a first ear engaging a first socket in the first retainer. Still further, the housing may include a first guide feature and the first actuator may include a first guide track slidably receiving the first guide feature. That first guide feature may include two opposed ribs and the first guide track may include two opposed channels receiving the two opposed ribs.

Further, the first retainer may include a first pivot pin. The housing may include two opposed gudgeons receiving the first pivot pin. In addition, the first biasing element may be a coil spring received over one end of the first pivot pin. Further, the first retainer may include a first lug, the first socket may be provided on a first side at a first end of the first retainer and the first lug may be on a second side at a second end of the first retainer.

Still further, the apparatus may include a first stop carried on the housing. The first stop may engage the first side of the second end of the first retainer when the first actuator is fully depressed to release the first lug from the retainer receiver. Still further, the retainer receiver may include a plurality of notches provided at spaced locations along the post. In addition, the apparatus may include a longitudinal groove in the post and a cooperating tab on the housing wherein the tab slides in the longitudinal groove when the retainer assembly is properly aligned on the post.

Still further, the retainer assembly may include a second retainer carried on the housing. That second retainer may be opposed to the first retainer. The first and second retainer may be provided at opposite sides of the post receiver.

The retainer assembly may further include a second actuator and a second biasing element carried on the housing. Further, the housing may include a second guide feature and the second actuator may include a second guide track slidably receiving the second guide feature.

Still further, the second actuator may include a second ear engaging a second socket in the second retainer. The second retainer may include a second lug. The second socket may be provided on one side at one end of the second retainer and the second lug may be provided on another side at an other end of the second retainer.

In accordance with an additional aspect, a new and improved method of removing a spare tire from a storage position in a motor vehicle comprises the steps of (a) depressing opposed actuators on a retainer assembly overlying the spare tire, (b) removing the retainer assembly from a post and (c) removing the spare tire from the post.

The method may further include the step of releasing opposed retainers of the retainer assembly from a retainer receiver in the post when depressing the opposed actuators. Further, the method may include the step of sliding the retainer assembly off an open end of the post when removing the retainer assembly from the post.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

FIG. 3B is an overhead perspective view illustrating the operator depressing the actuators in order to free the retainer assembly for removal from the post.

Reference will now be made in detail to the present preferred embodiments of the apparatus and method, examples of which are illustrated in the accompanying drawing figures.

DETAILED DESCRIPTION

Figure 1:
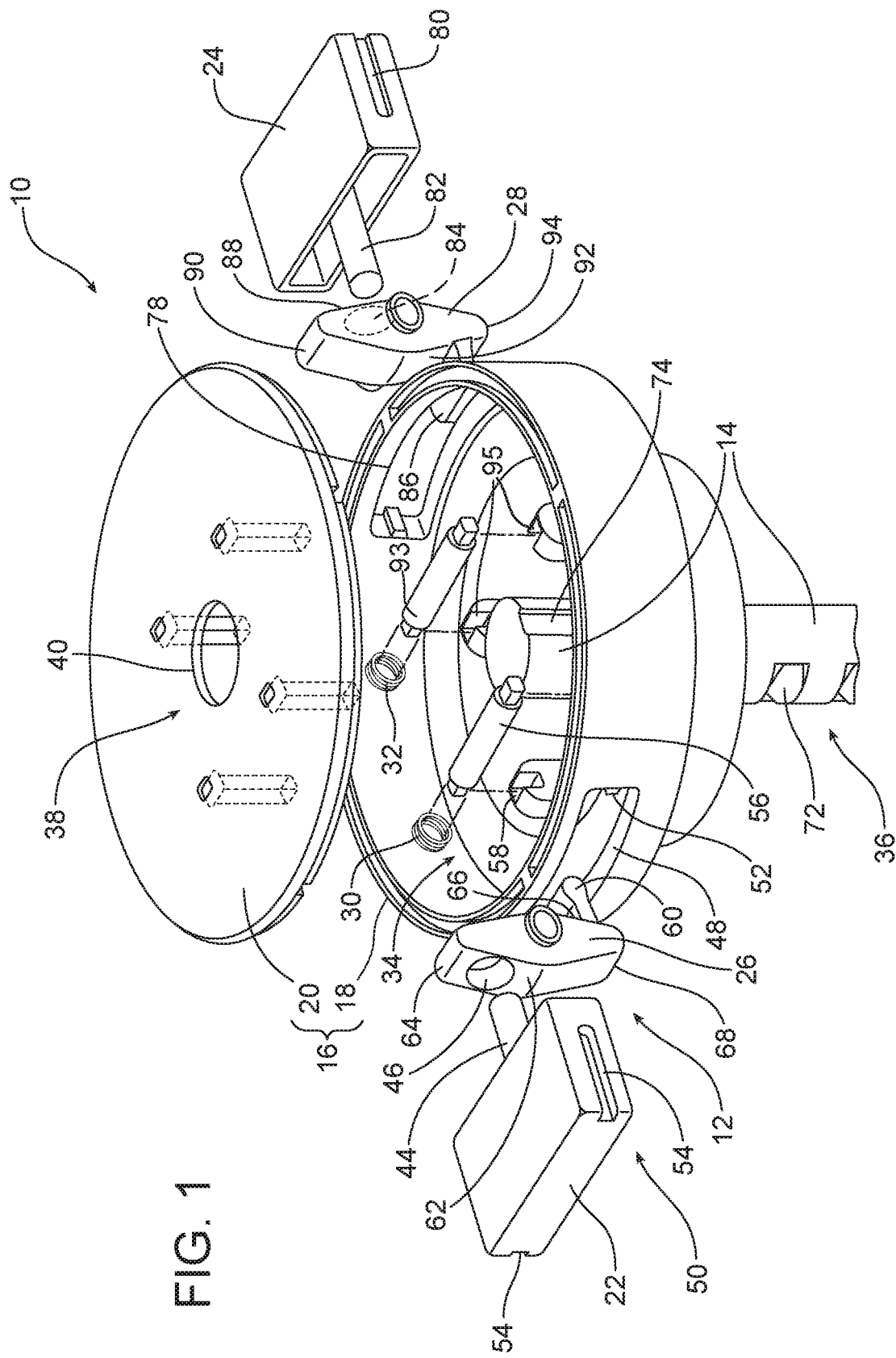
FIG. 1 is a detailed exploded perspective view of the apparatus including the retainer assembly and associated post upon which the retainer assembly is secured.
Figure 2A:
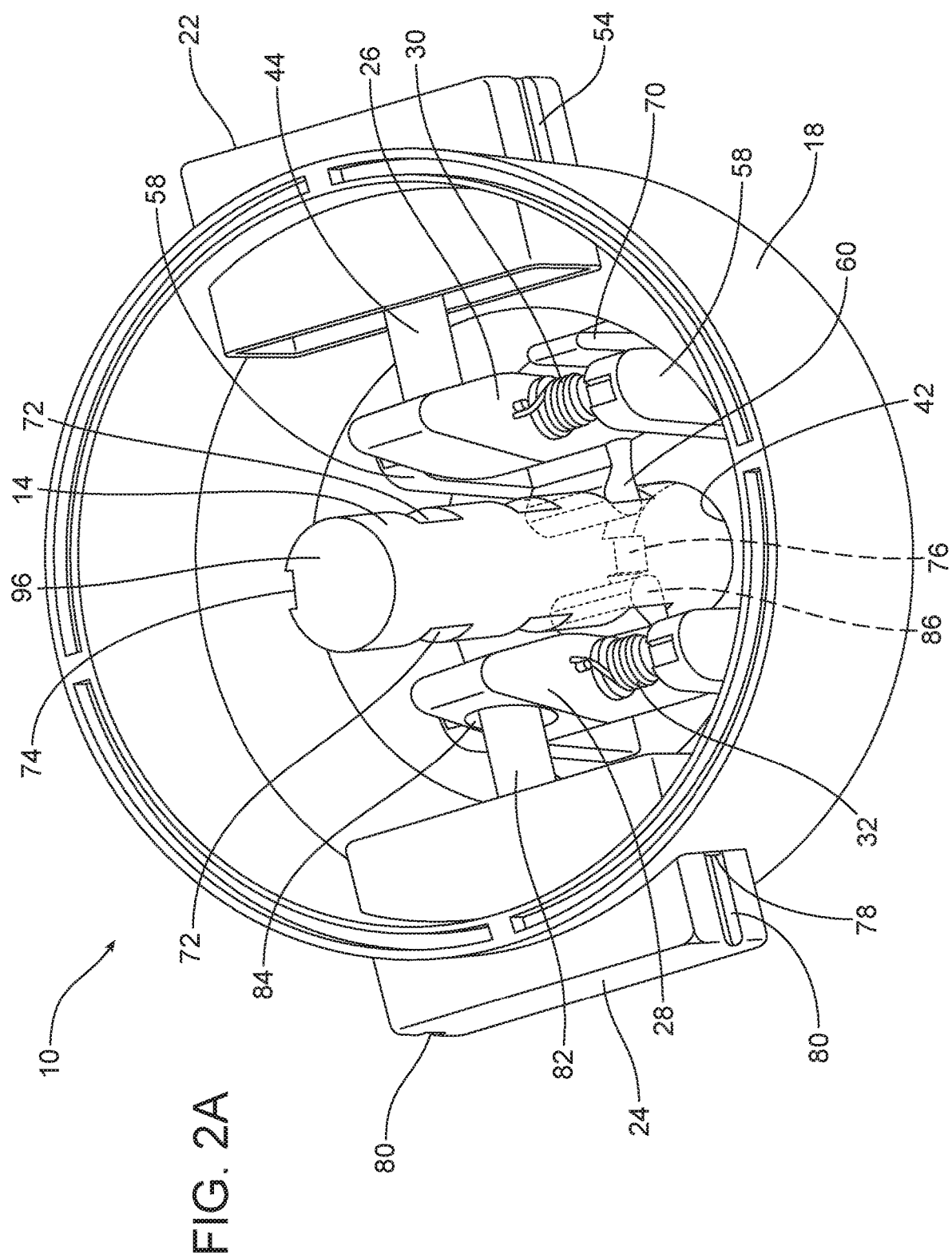
FIG. 2A is a detailed perspective view of the fully assembled retainer assembly showing the device in a first position wherein the retainer assembly is secured to the post.
Figure 2B:
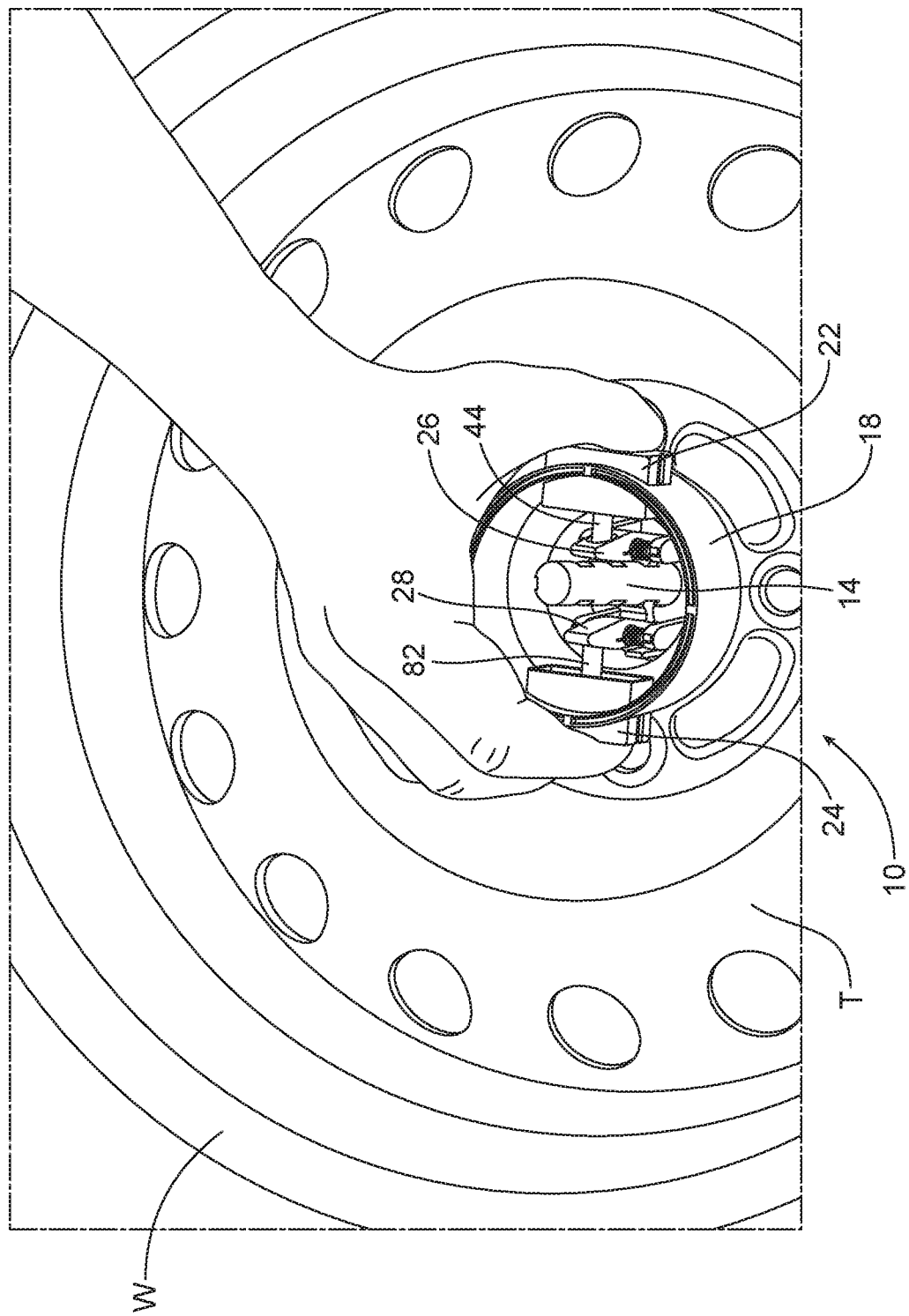
FIG. 2B is an overhead perspective view illustrating an operator engaging the actuators of the retainer assembly.
Figure 3A:
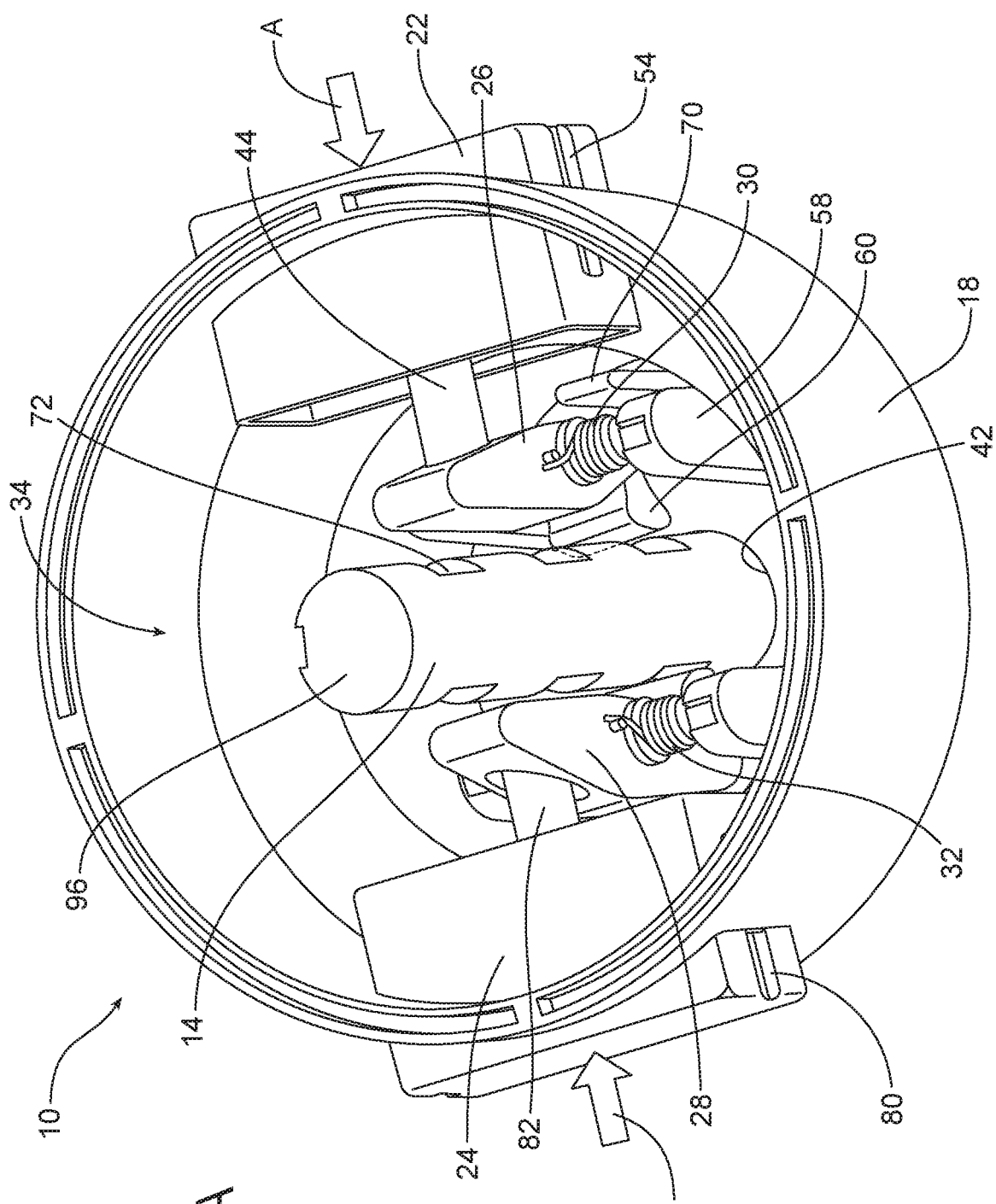
FIG. 3A is a detailed perspective view of the retainer assembly similar to that of FIG. 2A but showing the device in a second position wherein the opposed actuators have been depressed and the opposed retainer lugs pivoted free of the retainer receiver in the post to allow the retainer assembly to slide off the open end of the post freeing the spare tire for removal from the post.

Reference is now made to FIGS. 1, 2A, 2B, 3A and 3B which illustrate the apparatus 10 that provides a user friendly method for retaining in position and removing a spare tire T from a storage compartment such a spare tire well W of a motor vehicle. Such a spare tire well W may be found underneath the cargo floor in the cargo compartment of, for example, a sport utility vehicle or the trunk of a sedan. For purposes of this document, the spare tire T includes the actual spare tire and the wheel to which the spare tire is secured.

As illustrated, the apparatus 10 includes a retainer assembly 12 and a cooperating post 14. More particularly, the retainer assembly 12 includes a housing 16 comprising a base 18 and a cooperating lid 20. In addition, the retainer assembly 12 includes a first actuator 22 and a second actuator 24 opposed to the first actuator.

The retainer assembly 12 also includes a first retainer 26, a second retainer 28, a first biasing element 30 and a second biasing element 32. As should be appreciated, the first actuator 22, the second actuator 24, the first retainer 26, the second retainer 28, the first biasing element 30 and the second biasing element 32 are all retained in the internal compartment 34 formed in the housing 16 between the base 18 and the lid 20.

The post 14 includes a retainer receiver 36. As will be described in greater detail below and shown in FIGS. 2A and 2B, the first biasing element 30 biases the first retainer 26 into and the second biasing element 32 biases the second retainer 28 into engagement with the retainer receiver 36 to secure the retainer assembly 12 to the post 14 in a position overlying the spare tire T thereby holding the spare tire in position within the spare tire well W.

As illustrated, the housing 16 includes a post receiver 38. The post 14 extends through the post receiver when the retainer assembly 12 is secured to the post. In the illustrated embodiment, the post receiver 38 comprises two aligned apertures 40, 42: aperture 40 being provided in the lid and aperture 42 being provided in the base 18.

More particularly, the first actuator 22 includes a first ear 44 that engages in a first socket 46 of the first retainer 26. The housing 16 includes a first guide feature 48 and the first actuator 22 includes a first guide track 50 slidably received in the first guide feature. More particularly, in the illustrated embodiment, the first guide feature 48 includes two opposed ribs 52 and the first guide track 50 comprises two opposed channels 54 that receive the two opposed ribs.

The first retainer 26 pivots on a first pivot pin 56 and the housing 16 includes two opposed gudgeons 58 that receive the first pivot pin. Further, in the illustrated embodiment, the first biasing element 30 comprises a coil spring received over one of the first pivot pin 56.

The first retainer 26 includes a first lug 60. The first socket 46 is on a first side 62 at a first end 64 of the first retainer 26 while the first lug 60 is on a second side 66 of a second end 68 of the first retainer.

A first stop 70 is carried on the housing 16. The first stop 70 engages the first side 62 of the second end 68 of the first retainer 26 when the first actuator 22 is fully depressed to release the first lug 60 from the retainer receiver 36. (See FIGS. 3A and 3B.) As clearly illustrated in the drawing figures, the retainer receiver 36 of the illustrated embodiment includes a plurality of notches 72 provided at spaced locations along opposed sides of the post 14. Here it should also be noted that a longitudinal groove 74 may be provided in the post 14. A cooperating tab 76 is provided on the housing 16 and, more particularly, the base 18 at the aperture 42. As should be appreciated, one must properly orient the retainer assembly 12 with respect to the post 14 and align the tab 76 with the longitudinal groove 74 in order to insert the retainer assembly 12 over the post 14. This ensures proper orientation of the retainer assembly 12 with respect to the post 14 to allow engagement of the opposed first and second retainers 26, 28 in the opposed notches 72 of the retainer receiver 36 provided on the post 14.

The housing 16 also includes a second guide feature 78 and the second actuator 24 includes a second guide track 80 slidably receiving the second guide feature. The structural details of the second guide feature 78 and the second guide track 80 mirror, respectively, those of the first guide feature 48 and first guide track 50 previously described. The second actuator 24 is identical to the first actuator 22 and includes a second ear 82 that engages a second socket 84 in the second retainer 28. The second retainer 28 includes a second lug 86. The second socket 84 is provided on one side 88 of one end 90 of the second retainer 28 while the second lug 86 is provided on an other side 92 at the other end 94 of the second retainer. The second retainer 28 pivots on a second pivot pin 93 supported by two opposed gudgeons 95.

The operation of the apparatus 10 and the new and improved method of removing a spare tire T from a storage position or spare tire well W in a motor vehicle will now be describe in detail. As illustrated in FIGS. 2A, 2B and 3A, 3B, that method includes depressing, in the direction of action arrow A, the opposed actuators 22, 24 on the retainer assembly 12 overlying the spare tire T. This causes the releasing of the opposed retainers 26, 28 of the retainer assembly 12 from the retainer receiver 36 in the post 14. See particularly FIGS. 3A and 3B.

The method also includes the step of removing the retainer assembly 12 from the post 14. This may be done by sliding the retainer assembly upward in the direction of action arrow B off the open end 96 of the post 14. Once the retainer assembly 12 has been removed, the method includes removing the spare tire T from the post 14. The spare tire is then free to be used as desired.

The spare tire T may be locked in the desired storage position within the spare tire well W by positioning the spare tire T in the spare tire well W with the post 14 extending through the middle of the wheel. The retainer assembly 12 is then inserted onto the post 14 by aligning the tab 76 on the housing 16 with the longitudinal groove 74 in the post 14 and pressing the retainer assembly 12 down onto the post 14 in the direction of action arrow C against the wheel of the spare tire T. When the retainer assembly 12 is properly seated on the post 14, the first and second biasing elements 30, 32 ensure that the first and second retainers 26, 28 are securely engaged in the opposed notches 72 of the retainer receiver 36 thereby locking the spare tire T in position within the spare tire well W.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. An apparatus, comprising:
a retainer assembly including (a) a housing and (b) a first actuator, a first retainer and a first biasing element carried by said housing; and
a post having a retainer receiver wherein said first biasing element biases said first retainer into engagement with said retainer receiver.

2. The apparatus of claim 1, wherein said housing includes a post receiver, said post extending through said post receiver when said retainer assembly is secured to said post.

3. The apparatus of claim 2, wherein said first actuator includes a first ear engaging a first socket in said first retainer.

4. The apparatus of claim 3, wherein said housing includes a first guide feature and said first actuator includes a first guide track slidably receiving said first guide feature.

5. The apparatus of claim 4, wherein said first guide feature includes two opposed ribs and said first guide track includes two opposed channels receiving said two opposed ribs.

6. The apparatus of claim 4, wherein said first retainer includes a first pivot pin and said housing includes two opposed gudgeons receiving said first pivot pin.

7. The apparatus of claim 6, wherein said first biasing element is a coil spring received over said first pivot pin.

8. The apparatus of claim 7, wherein said first retainer includes a first lug, said first socket is on a first side at a first end of said first retainer and said first lug is on a second side at a second end of said first retainer.

9. The apparatus of claim 8, further including a first stop carried on said housing, said first stop engaging said first side of said second end of said first retainer when said first actuator is fully depressed to release said first lug from said retainer receiver.

10. The apparatus of claim 9, wherein said retainer receiver includes a plurality of notches provided at spaced locations along said post.

11. The apparatus of claim 10, including a longitudinal groove in said post and a cooperating tab on said housing wherein said cooperating tab slides in said longitudinal groove when said retainer assembly is properly aligned on said post.

12. The apparatus of claim 11, wherein said retainer assembly further includes a second retainer carried on said housing.

13. The apparatus of claim 12, wherein said second retainer is opposed to said first retainer and said first retainer and said second retainer are provided at opposite sides of said post receiver.

14. The apparatus of claim 13, wherein said retainer assembly further includes a second actuator and a second biasing element carried on said housing.

15. The apparatus of claim 14, wherein said housing includes a second guide feature and said second actuator includes a second guide track slidably receiving said second guide feature.

16. The apparatus of claim 15, wherein said second actuator includes a second ear engaging a second socket in said second retainer.

17. The apparatus of claim 16, wherein said second retainer includes a second lug, said second socket is on one side at one end of said second retainer and said second lug is on an other side at an other end of said second retainer.

* * * * *